United States Patent Office 2,807,873
Patented Oct. 1, 1957

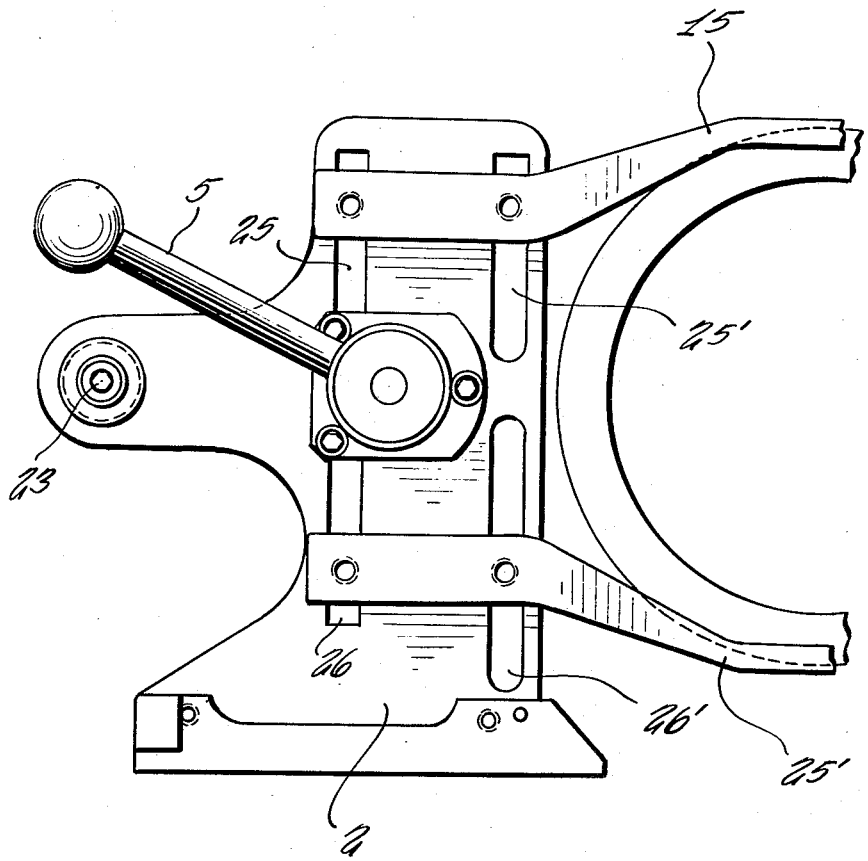

2,807,873

CLAMPING DEVICES

Alfons Weissenberger, Opladen, Germany, assignor to Goetzewerke Friedrich Goetze Aktiengesellschaft, Burscheid, near Koln, Germany Application April 19, 1955, Serial No. 502,271

Claims priority, application Germany April 22, 1954

5 Claims. (Cl. 29—269)

This invention relates to a device for introducing annular workpieces, for example piston rings, assembled to form a group into machine tools in which their internal and external peripheral surfaces are machined.

In the machining of piston rings assembled to form a cylindrical group or set of rings, in particular so-called non-circular rings, which are radially tensioned by giving the initially circular rings a non-circular shape by means of internal and external machining and then inserting them in circular cylinders after a narrow sector has been cut out, it is of the greatest importance that the rings to be machined in a group should be aligned beforehand exactly concentrically in relation to one another and that the said centering should be accurately maintained both during the insertion of the group in the machine tool and during the shaping operation thereon. This is particularly important if the rings are to be machined simultaneously at their external and internal peripheral surfaces by turning, milling or by some other cutting method, because the working pressure of the tools is then substantially greater than in the case of machining on one side.

Such groups of rings are clamped on a machine suitable for simultaneous internal and external machining, between the facing end surfaces of two cylindrical bushes, one of which is fixed to the working spindle, while the other is freely rotatable about its axis, which coincides with the axis of the spindle, and is connected to a hydraulic or other type of pressure arrangement.

The clamping devices heretofore known cannot be used for machines which are equipped with tools for simultaneously machining internal and external surfaces. In the known clamping devices, the group of rings is clamped between two faceplates, which are braced with respect to one another by means of screws or bolts. During the machining of the internal surfaces of the rings, the bolts are located outside the group of piston rings and the tool is introduced through an opening in one of the faceplates. If the piston rings are to be turned subsequently on the outside after the internal machining, the faceplates are clamped by means of a clamping mandrel disposed within the group of rings. The clamping bolts or screws provided outside the periphery of the piston rings can thereafter be removed and the external periphery of the group of piston rings can be turned. The piston rings, it is true, can therefore be machined from the inside and from the outside in succession without unclamping them, but a continuous working process is not possible because of the necessary clamping and spanning of the group.

The object of the invention is to provide a device which enables rings assembled to form a substantially cylindrical group and aligned concentrically in relation to one another to be introduced into a machine tool suitable for the simultaneous machining of their internal and external peripheries and, when required, to be removed therefrom, while maintaining the centering effect, and to be transferred to a further working machine, for example one for splitting the rings.

According to the invention, the device comprises two parallel plates movable toward and away from each other by means of one or more oppositely screw threaded members engaging with the plates or parts fixed thereto each plate being provided with two clamping arms projecting in the plane of the plate for gripping an end face of the group. In order to obtain, on the one hand, rapid and, on the other hand, reliable clamping, the two plates carrying the clamping arms are connected by means of a spindle rotatably mounted in one plate and a bush on the other plate surrounding the said spindle. The spindle rotates at least one screw nipple connected between bushes on each plate. The nipple has right-hand and left-hand threads arranged one after the other. By arranging in series two nipples sliding on and rotating with the spindle, one of which engages by means of a left-hand thread with a bush fixed to one plate while the other engages by means of a right-hand thread with the bush fixed to the other plate and both of which engage at their ends facing one another with a sleeve provided with threads of opposite hands and which is prevented from rotating, a clamping stroke can be obtained with each turn of the spindle which amounts to four times the pitch of the threads used. Each of the screw nipples is advantageously guided on the spindle by means of a key or feather engaging in an axially directed groove in the spindle and the threaded sleeve connecting the nipples is preferably guided by means of a key or feather in a longitudinal groove in the inner wall of a further sleeve which is fixed to the plate carrying the spindle and which engages over the bush on the other plate.

In order to produce an adequate clamping pressure, square or trapezoidal threads of small pitch are preferably employed.

So that the device may always have the same desired opening between the clamping arms it is advantageous to provide a stop between the plates at a point located at the opposite end to the projecting ends of the clamping arms, the parts of the said stop being expediently constructed as additional guide means, for example as a pin and a sleeve surrounding the same. The stop is conveniently adapted to be adjusted by means of a set-screw.

If the device is to be used for clamping different diameters of groups of rings, the clamping arms must be mounted on the plates carrying them so that they can be adjusted with respect to one another. This can be done most simply by means of bolts passing through fitted holes in the clamping arms and longitudinal slots in the plates.

The clear distance between the clamping arms secured to one plate of the device is so chosen in any given instance that it corresponds to the external diameter of the clamping bushes on the working machine. This diameter is therefore made smaller than the external diameter of the rings by such an amount that the rings can still be safely gripped by the clamping device close to the outer periphery of their end faces. After the group of rings has been introduced into the machine, the clamping bushes can then be applied between the clamping arms against the end faces of the rings disposed on the outside of the group. However, it is also possible to proceed in such manner that the clamping arms are introduced tangentially to the correspondingly more closely placed clamping bushes of the machine.

An embodiment of the invention is illustrated by way of example in the accompanying drawings in which:

Fig. 2 is an end elevation of the device.

Figure 1:
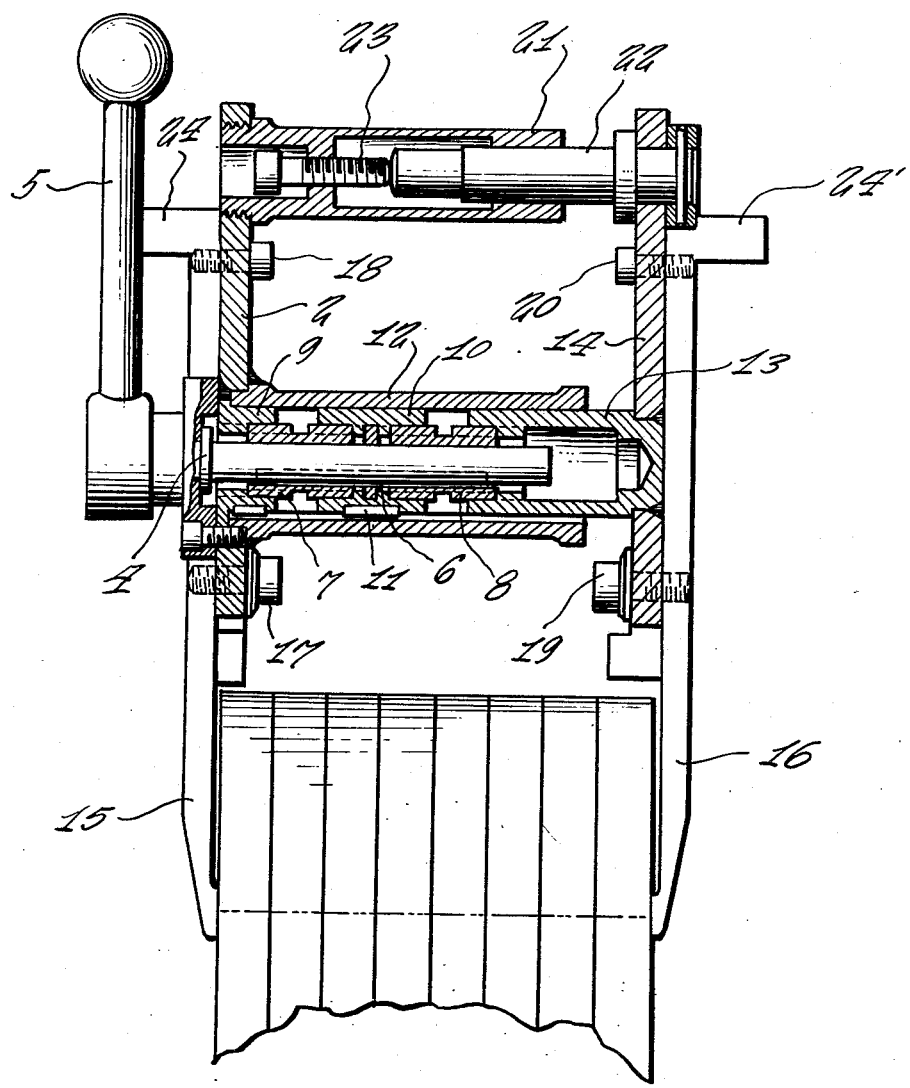
Fig. 1 is a longitudinal section through the clamping device substantially along the axes of the spindle and stop bush.

Referring to the drawings, a spindle 1 (Fig. 1) is rotatably mounted in a plate 2 and secured against axial displacement therein by means of a retaining disc or plate 3 and a flange 4. The spindle 1 can be turned by means of a handle 5. Screw nipples 7 and 8, each of which engages by means of a key or feather 6 in an axial groove in the spindle and which are provided with external threads of opposite hands are guided on the spindle 1 so as to be longitudinally displaceable thereon. The nipple 7 is in engagement at one end with a bush 9 secured so as to be non-rotatable to the plate 2 and at the other end with a sleeve 10 provided with opposite internal threads. The sleeve 10 is guided so as to be axially movable, by means of a key or feather 11, in an outer sleeve 12 likewise fixed to the plate 2. The screw nipple 8 is in engagement at one end with the sleeve 10 and at the other end with an internal thread in the bush 13, which is fixed to the plate 14. Two clamping arms 15, 15' are secured to the plate 2 and two clamping arms 16, 16' are secured to the plate 14 by bolts 17, 18 and 19, 20 respectively, and project beyond but parallel to the plates. The bolts pass through slots 25, 25', 26, 26' in the plates.

On the side opposite the clamping arms, a guide sleeve 21 and a stop pin 22 are provided between the plates 2 and 14. The distance of projection of the pin 22 into the sleeve 21 is adjustable by means of a screw 23.

Stops 24 and 24', respectively, are furthermore provided on each of the plates 2 and 14, the said stops being brought up against a counter-stop on the machine when the group of piston rings is introduced into the machine tool, whereby the exact position of the group of piston rings in the machine is obtained and further centering becomes superfluous. The clamping arms 15, 15' and 16, 16' engage in recesses in the clamping bushes of the machine, the recesses being open towards the bearing faces of the bushes.

The clamping of the piston rings assembled to form a group is effected as follows:

After the piston rings have been assembled into a substantially cylindrical group and the stop members 22, 23 have been set to the appropriate length of the group, the group is between the clamping arms 15, 15' at one end and 16, 16' at the other end. The spindle 1 is thereupon turned by means of the handle 5, whereby the rings are firmly clamped together in the axial direction after a small turn. As the spindle 1 is turned, the screw nipple 7 is drawn into the bush 9, while, by means of its other opposite thread, it draws the sleeve 10 towards the bush 9. Owing to this, the screw nipple 8 and the plate 14 are also tightened. The displacement of the plates 2 and 14 towards one another is further increased owing to the rotation of the nipple 8, carried along by the spindle 1, within the sleeve 10 and the bush 13. The stop device consisting of the parts 21, 22, 23 has the object at the same time of preventing any angular deflection of the plates 2, 14 owing to abutment of the arms 15, 15' and 16, 16' against the group of rings. Release of the clamping device takes place in reverse sequence.

We claim:

1. A clamping device for clamping together annular workpieces comprising, in combination, first and second substantially parallel spaced plates; means at one end of each of said plates for holding these in parallel alignment; two pair of clamping arms, each pair secured to and provided with gripping portions extending from the opposite ends of said plates in the planes thereof; two internally oppositely threaded bushes interiorly secured at the other end of each of said plates; a longitudinally grooved spindle rotatably mounted in said other end of the first plate and extending through the bush secured to said plate; a first exteriorly threaded nipple slidably mounted on the end portion of the spindle adjacent to the first plate and engaging with the threads in bush secured to the said first plate; a second nipple exteriorly threaded oppositely to the first nipple and slidably mounted on the other end portion of the spindle and engaging with the threads of said other bush, both said nipples being provided in their interior part with keys for slidably engaging with the grooves of said spindle; an outer sleeve having one end secured to the first plate about one end of the bushes and its other end slidably engaged with the bush secured to said second plate, said sleeve having an internal longitudinal groove; an inner sleeve longitudinally slidably movable in the outer sleeve and provided exteriorly with a key in slidable engagement with the said groove of the outer sleeve, said inner sleeve having oppositely arranged interior threads on each end thereof for engaging with the corresponding threads of the first and second nipples, said inner sleeve being provided with a key engaging with the said groove of said outer sleeve; and lever means secured to the said spindle exteriorly of the said first plate for imparting a rotating movement to the spindle.

2. A clamping device for clamping together annular workpieces comprising, in combination, first and second substantially parallel spaced plates; means at one end of each of said plates for holding these in parallel alignment, said means comprising a sleeve between said plates secured to said end of the first plate and provided with an interior threaded portion adjacent that end, a guide pin secured to the corresponding end of the second plate extending into the other end of said sleeve and in slidable engagement therewith, an adjusting screw extending into the sleeve through its threaded portion and contacting the guide pin for effecting a spatial adjustment between said plates; two pair of clamping arms each pair secured to and provided with gripping portions extending from the opposite ends of said plates in the planes thereof; two internally oppositely threaded bushes interiorly secured at the other ends of each of said plates; a longitudinally grooved spindle rotatably mounted in said other end of the first plate and extending through the bush secured to said plate; a first exteriorly threaded nipple slidably mounted on the end portion of the spindle adjacent to the first plate and engaging with the threads in the bush secured to the said first plate; a second nipple exteriorly threaded oppositely to the first nipple and slidably mounted on the other end portion of the spindle and engaging with the threads of said other bush, both said nipples being provided in their interior parts with keys for slidably engaging with the groove of said spindle; an outer sleeve having one end secured to the first plate about one end of the bushes and its other end slidably engaged with the bush secured to said second plate, said sleeve having an internal longitudinal groove; an inner sleeve longitudinally slidably movable in the outer sleeve and provided exteriorly with a key in slidable engagement with the said groove of the outer sleeve, said inner sleeve having oppositely arranged interior threads on each end thereof for engaging with the corresponding threads of the first and second nipples, said inner sleeve being provided with a key engaging with the said groove of said outer sleeve; and lever means secured to the said spindle exteriorly of the said first plate for imparting a rotating movement to the spindle.

3. A clamping device for clamping together annular workpieces comprising, in combination, first and second substantially parallel spaced plates; means at one end of each of said plates for holding these in parallel alignment, said means comprising a sleeve between said plates secured to said end of the first plate and provided with an interior threaded portion adjacent that end, a guide pin secured to the corresponding end of the second plate extending into the other end of said sleeve and in slidable engagement therewith, an adjusting screw extending into the sleeve through its threaded portion and contacting the guide pin for a spatial adjustment between said plates; two pair of clamping arms each pair secured to and provided with gripping portions extending from the opposite ends of said plates in the planes thereof; means associated with each pair of said clamping arms and the respective plates bearing the same for spatial adjustment of the arms with respect to one another; two internally oppositely threaded bushes interiorly secured at the other ends of each of said plates; a longitudinally grooved spindle rotatably mounted in said other end of the first plate and extending through the bush secured to said plate; a first exteriorly threaded nipple slidably mounted on the end portion of the spindle adjacent to the first plate and engaging with the threads in the bush secured to the said first plate; a second nipple exteriorly threaded oppositely to the first nipple and slidably mounted on the other end portion of the spindle and engaging with the threads of said other bush, both said nipples being provided in their interior parts with keys for slidably engaging with the groove of said spindle; an outer sleeve having one end secured to the first plate about one end of the bushes and its other end slidably engaged with the bush secured to said second plate, said sleeve having an internal longitudinal groove; an inner sleeve longitudinally slidably movable in the outer sleeve and provided exteriorly with a key in slidable engagement with the said groove of the outer sleeve, said inner sleeve having oppositely arranged interior threads on each end thereof for engaging with the corresponding threads of the first and second nipples, said inner sleeve being provided with a key engaging with the said groove of said outer sleeve; and lever means secured to the said spindle exteriorly of the said first plate for imparting a rotating movement to the spindle.

4. A clamping device for clamping together annular workpieces comprising, in combination, first and second substantially parallel spaced plates; means at one end of each of said plates for holding these in parallel alignment, said means comprising a sleeve between said plates secured to said end of the first plate and provided with an interior threaded portion adjacent that end, a guide pin secured to the corresponding end of the second plate extending into the other end of said sleeve and in slidable engagement therewith, an adjusting screw extending into the sleeve through its threaded portion and contacting the guide pin for a spatial adjustment between said plates; two pair of clamping arms, each pair secured to and provided with gripping portions extending from the opposite ends of said plates in the planes thereof; said gripping portions being arcuately shaped to correspond with the annular workpieces to be clamped together; means associated with each pair of said clamping arms and the respective plates bearing the same for spatial adjustment of the arms with respect to one another; two internally oppositely threaded bushes interiorly secured at the other ends of each of said plates; a longitudinally grooved spindle rotatably mounted in said other end of the first plate and extending through the bush secured to said plate; a first exteriorly threaded nipple slidably mounted on the end portion of the spindle adjacent to the first plate and engaging with the threads in the bush secured to the said first plate; a second nipple exteriorly threaded oppositely to the first nipple and slidably mounted on the other end portion of the spindle and engaging with the threads of said other bush, both said nipples being provided in their interior parts with keys for slidably engaging with the groove of said spindle; an outer sleeve having one end secured to the first plate about one end of the bushes and its other end slidably engaged with the bush secured to said second plate, said sleeve having an internal longitudinal groove; an inner sleeve longitudinally slidably movable in the outer sleeve and provided exteriorly with a key in slidable engagement with the said groove of the outer sleeve, said inner sleeve having oppositely arranged interior threads on each end thereof for engaging with the corresponding threads of the first and second nipples, said inner sleeves being provided with a key engaging with the said groove of said outer sleeve; and lever means secured to the said spindle exteriorly of the said first plate for imparting a rotating movement to the spindle.

5. The structure of claim 4, provided with stop means extending exteriorly of the plates for aligning the workpiece.

References Cited in the file of this patent

UNITED STATES PATENTS

| | | |
|---|---|---|
| 788,287 | Swanson | Apr. 25, 1905 |
| 2,170,535 | Mardsen | Aug. 22, 1939 |
| 2,320,606 | Jesionowski | June 1, 1943 |